(12) United States Patent
Morris et al.

(10) Patent No.: US 11,643,950 B2
(45) Date of Patent: May 9, 2023

(54) METHOD FOR CONTROLLING CAMSHAFT ORIENTATION FOR IMPROVED ENGINE RE-STARTING OF AN ENGINE HAVING START-STOP CAPABILITY

(71) Applicant: BorgWarner Inc., Auburn Hills, MI (US)

(72) Inventors: Andrew Morris, Geneva, NY (US); Jiju Alexander, Ithaca, NY (US); Daniel Brown, Freeville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/319,185

(22) Filed: May 13, 2021

(65) Prior Publication Data

US 2022/0364485 A1   Nov. 17, 2022

(51) Int. Cl.
| | |
|---|---|
| *F01L 9/20* | (2021.01) |
| *F01L 1/344* | (2006.01) |
| *F02D 13/08* | (2006.01) |
| *F01L 1/352* | (2006.01) |

(52) U.S. Cl.
CPC ............... *F01L 9/20* (2021.01); *F01L 1/344* (2013.01); *F02D 13/08* (2013.01); *F01L 1/352* (2013.01); *F01L 2800/01* (2013.01); *F01L 2820/032* (2013.01); *F01L 2820/041* (2013.01); *F01L 2820/044* (2013.01)

(58) Field of Classification Search
CPC ... F01L 1/34; F01L 1/344; F01L 1/352; F01L 9/20; F01L 2013/116; F01L 19/004; F01L 2800/01; F01L 2800/03; F01L 2820/032; F01L 2820/044; F02D 13/0215; F02D 13/0219; F02D 13/0234; F02D 13/0238; F02D 13/0249; F02D 13/08; F02D 41/042; F02D 41/06; F02D 41/062; F02D 41/064; F02D 41/065
See application file for complete search history.

(56) References Cited

U.S. PATENT DOCUMENTS

| | | |
|---|---|---|
| 7,159,545 B2 | 1/2007 | Miyakoshi et al. |
| 7,252,055 B2 | 8/2007 | Tani et al. |
| 7,954,466 B2 | 6/2011 | Nguyen et al. |

(Continued)

FOREIGN PATENT DOCUMENTS

| | | | |
|---|---|---|---|
| JP | 2014047694 A | * | 3/2014 |
| WO | WO-2022049869 A1 | * | 3/2022 |

*Primary Examiner* — John M Zaleskas
(74) *Attorney, Agent, or Firm* — Reising Ethington P.C.

(57) ABSTRACT

A method includes determining a value of an operational motor current limit and setting a value of a startup current limit equal to a predetermined value in excess of the value of the operational motor current limit if a set of predetermined conditions is satisfied. The method includes determining that operation of the engine has been interrupted, operating the electric motor of the variable valve timing mechanism with a current having a magnitude that is less than or equal to the startup current limit after determining that operation of the engine has been interrupted, determining that operation of the engine has resumed, and operating the electric motor of the variable valve timing mechanism with a current having a magnitude that is less than or equal to the operational motor current limit after determining that operation of the engine has resumed.

9 Claims, 4 Drawing Sheets

(56) References Cited

U.S. PATENT DOCUMENTS

| | | |
|---|---|---|
| 8,205,584 B2 | 6/2012 | Noda et al. |
| 8,220,426 B2 | 7/2012 | Uehama et al. |
| 8,238,121 B2 | 8/2012 | Torrico-Bascope et al. |
| 8,495,981 B2 | 7/2013 | Stewart et al. |
| 2005/0211207 A1* | 9/2005 | Urushihata ............ F01L 1/352 123/90.15 |
| 2005/0235938 A1* | 10/2005 | Tani ................... F01L 1/352 123/90.17 |
| 2006/0102125 A1* | 5/2006 | Mashiki ................. F01L 9/20 123/90.15 |
| 2007/0221150 A1* | 9/2007 | Inoue ................... F01L 1/352 123/90.15 |
| 2007/0227482 A1* | 10/2007 | Inoue ................... F01L 1/024 123/90.31 |
| 2007/0227483 A1* | 10/2007 | Inoue ................... F01L 1/352 123/90.31 |
| 2008/0011253 A1* | 1/2008 | Nakamura ......... F01L 13/0026 123/90.15 |
| 2008/0065307 A1* | 3/2008 | Tanaka ................. F01L 1/352 123/90.15 |
| 2008/0065308 A1* | 3/2008 | Tanaka ................. F01L 1/352 123/90.15 |
| 2008/0066700 A1* | 3/2008 | Mashiki ................ F01L 1/022 123/90.11 |
| 2008/0071463 A1* | 3/2008 | Tanaka ................. F01L 1/352 123/90.15 |
| 2008/0081702 A1* | 4/2008 | Tanaka ................. F01L 1/352 464/1 |
| 2008/0257292 A1* | 10/2008 | Inoue ................... F01L 1/352 123/90.31 |
| 2009/0025665 A1* | 1/2009 | Inoue ................ F02D 13/0219 123/90.15 |
| 2009/0055085 A1* | 2/2009 | Inoue ................ F02D 41/0002 123/90.15 |
| 2009/0071425 A1* | 3/2009 | Inoue ................... F01L 1/352 123/90.15 |
| 2009/0088955 A1* | 4/2009 | Okamoto ............ F01L 13/0026 123/90.2 |
| 2009/0101094 A1* | 4/2009 | Mashiki ................ F02D 41/221 123/90.17 |
| 2009/0101095 A1* | 4/2009 | Inoue ................... F01L 1/344 701/112 |
| 2010/0012061 A1* | 1/2010 | Mashiki ................. F01L 1/352 318/683 |
| 2010/0224153 A1* | 9/2010 | Ichimoto ............ F02D 13/0265 123/90.17 |
| 2010/0235067 A1* | 9/2010 | Nomura ............. F02D 13/0238 123/90.15 |
| 2011/0100312 A1* | 5/2011 | Hirata .................. F01L 1/022 123/90.17 |
| 2012/0247411 A1* | 10/2012 | Stewart .................. F01L 1/34 123/90.17 |
| 2013/0139770 A1* | 6/2013 | Shogenji ............. F02D 41/2461 123/90.15 |
| 2013/0247853 A1* | 9/2013 | Mikawa ............. F02D 13/0238 123/90.15 |
| 2013/0268179 A1* | 10/2013 | Wang ................... F01L 1/352 123/90.17 |
| 2014/0076251 A1* | 3/2014 | Matsuo ............... F02D 41/062 123/90.15 |
| 2015/0090218 A1* | 4/2015 | Nagaoka ............ F02D 41/402 123/305 |
| 2015/0219020 A1* | 8/2015 | Doering ................. F02D 9/00 701/105 |
| 2015/0260128 A1 | 9/2015 | Roth |
| 2015/0292393 A1 | 10/2015 | Roth et al. |
| 2016/0160710 A1 | 6/2016 | Roth et al. |
| 2016/0169072 A1 | 6/2016 | Roth |
| 2016/0195047 A1 | 7/2016 | Carter et al. |
| 2017/0122137 A1* | 5/2017 | Brown ................... F01L 1/047 |
| 2017/0145874 A1 | 5/2017 | Wing et al. |
| 2017/0248045 A1 | 8/2017 | Pritchard et al. |
| 2017/0248047 A1 | 8/2017 | Simpson et al. |
| 2017/0254235 A1 | 9/2017 | Pluta et al. |
| 2018/0187617 A1 | 7/2018 | Shutty et al. |
| 2018/0320564 A1 | 11/2018 | Pluta et al. |
| 2018/0320566 A1 | 11/2018 | Wigsten et al. |
| 2019/0010837 A1 | 1/2019 | Pritchard et al. |
| 2019/0292953 A1 | 9/2019 | McCloy et al. |
| 2020/0080449 A1 | 3/2020 | McCloy et al. |

* cited by examiner

METHOD FOR CONTROLLING CAMSHAFT ORIENTATION FOR IMPROVED ENGINE RE-STARTING OF AN ENGINE HAVING START-STOP CAPABILITY

FIELD

The present disclosure relates to a method for controlling camshaft orientation for improved engine re-starting of an engine having start-stop capability.

BACKGROUND

This section provides background information related to the present disclosure which is not necessarily prior art.

Modern automotive engines commonly employ a variable valve timing (VVT) mechanism to change the phase or timing (relative to the rotational position of the crankshaft) with which the intake and/or exhaust valves are open. The VVT mechanisms typically adjust the phase of the opening of the intake and/or exhaust valves by rotating a camshaft that is employed to control the opening and closing of the valves. It is common for such VVT mechanisms to rotate the camshaft with an electric motor.

It is known in the art to employ a VVT mechanism in an engine with start-stop capabilities to put the engine into a state where it is better suited to be re-started. The VVT mechanism is employed in such situations to pre-position the camshaft in an orientation that is more suitable for re-starting the engine. The VVT mechanism may further be employed to adjust the phasing of the camshaft (relative to the crankshaft) during an engine start sequence to improve the start-ability of the engine, for example by reducing the amount of torque that is needed to initiate rotation of the crankshaft by retarding the timing of the engine. When techniques to reduce the amount of torque that is needed to initiate rotation of the crankshaft and to retard the timing of the engine are used together, there is a need to gradually but quickly advance the phasing of the camshaft. While the known techniques for operating a VVT mechanism are suitable for their intended purpose, such techniques are nonetheless susceptible to improvement.

SUMMARY

This section provides a general summary of the disclosure, and is not a comprehensive disclosure of its full scope or all of its features.

In one form, the present disclosure provides a method for operating a variable valve timing mechanism that controls the phasing of a camshaft in an engine, where the variable valve timing mechanism has an electric motor. The method includes determining a value of an operational motor current limit and setting a value of a startup current limit equal to a predetermined value in excess of the value of the operational motor current limit if a set of predetermined conditions is satisfied, or otherwise employing the value of the operational motor current limit as the value of the startup current limit. The method includes determining that operation of the engine has been interrupted, operating the electric motor of the variable valve timing mechanism with a current having a magnitude that is less than or equal to the startup current limit after determining that operation of the engine has been interrupted, determining that operation of the engine has resumed, and operating the electric motor of the variable valve timing mechanism with a current having a magnitude that is less than or equal to the operational motor current limit after determining that operation of the engine has resumed.

In some forms, the set of predetermined conditions includes a temperature of the electric motor being less than a predetermined temperature threshold. In some forms, a magnitude of the predetermined value is based on an age of the electric motor. In some forms, a magnitude of the predetermined value is based on a temperature of the electric motor. In some forms, the value of the operational motor current limit is based on a temperature of the electric motor. In some forms, the value of the operational motor current limit is determined by a step function that is based on the temperature of the electric motor. In some forms, determining that operation of the engine has resumed is based at least partly on a control signal provided by an engine controller. In some forms, determining that operation of the engine has resumed is based on an algorithm that utilizes one or more parameters of the engine. In some forms, determining that operation of the engine has resumed is based on one or more parameters of the variable valve timing mechanism. In some forms, determining that operation of the engine has resumed is based on a value of a timer.

The present disclosure also provides a method for operating a variable valve timing mechanism that controls the phasing of a camshaft in an engine, where the variable valve timing mechanism has an electric motor. The method includes determining that operation of the engine has been interrupted, and operating the electric motor in a re-start mode to control phasing of the camshaft upon determining that operation of the engine has been interrupted. The method includes determining independently of a dedicated restart signal that operation of the engine has resumed, and operating the electric motor in an engine operating mode to control phasing of the camshaft upon determining that operation of the engine has resumed.

In some forms, determining that operation of the engine has been interrupted includes determining if a rotational speed of the electric motor is less than or equal to a predetermined motor speed threshold. In some forms, determining that operation of the engine has been interrupted includes determining that the rotational speed of the electric motor has been less than or equal to the predetermined motor speed threshold for a length of time that is greater than or equal to a predetermined time threshold. In some forms, determining that operation of the engine has been interrupted includes determining that a magnitude of a duty cycle with which electrical power is supplied to the electric motor is within a predetermined range of magnitudes. In some forms, determining that operation of the engine has been interrupted includes determining that a magnitude of a duty cycle with which electrical power is supplied to the electric motor is less than a predetermined duty cycle threshold. In some forms, determining that operation of the engine is being resumed includes determining if a rotational speed of the electric motor is greater than a predetermined motor speed threshold. In some forms, determining that operation of the engine is being resumed includes determining that the rotational speed of the electric motor has been greater than or equal to the predetermined motor speed threshold for a length of time that is greater than or equal to a predetermined time threshold. In some forms, determining that operation of the engine is being resumed includes determining that a magnitude of a duty cycle with which electrical power is supplied to the electric motor is greater than or equal to a predetermined duty cycle threshold. In some forms, determining that operation of the engine is being resumed includes determining that a magnitude of a duty cycle with which electrical power is supplied to the electric motor is greater than or equal to a predetermined duty cycle threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
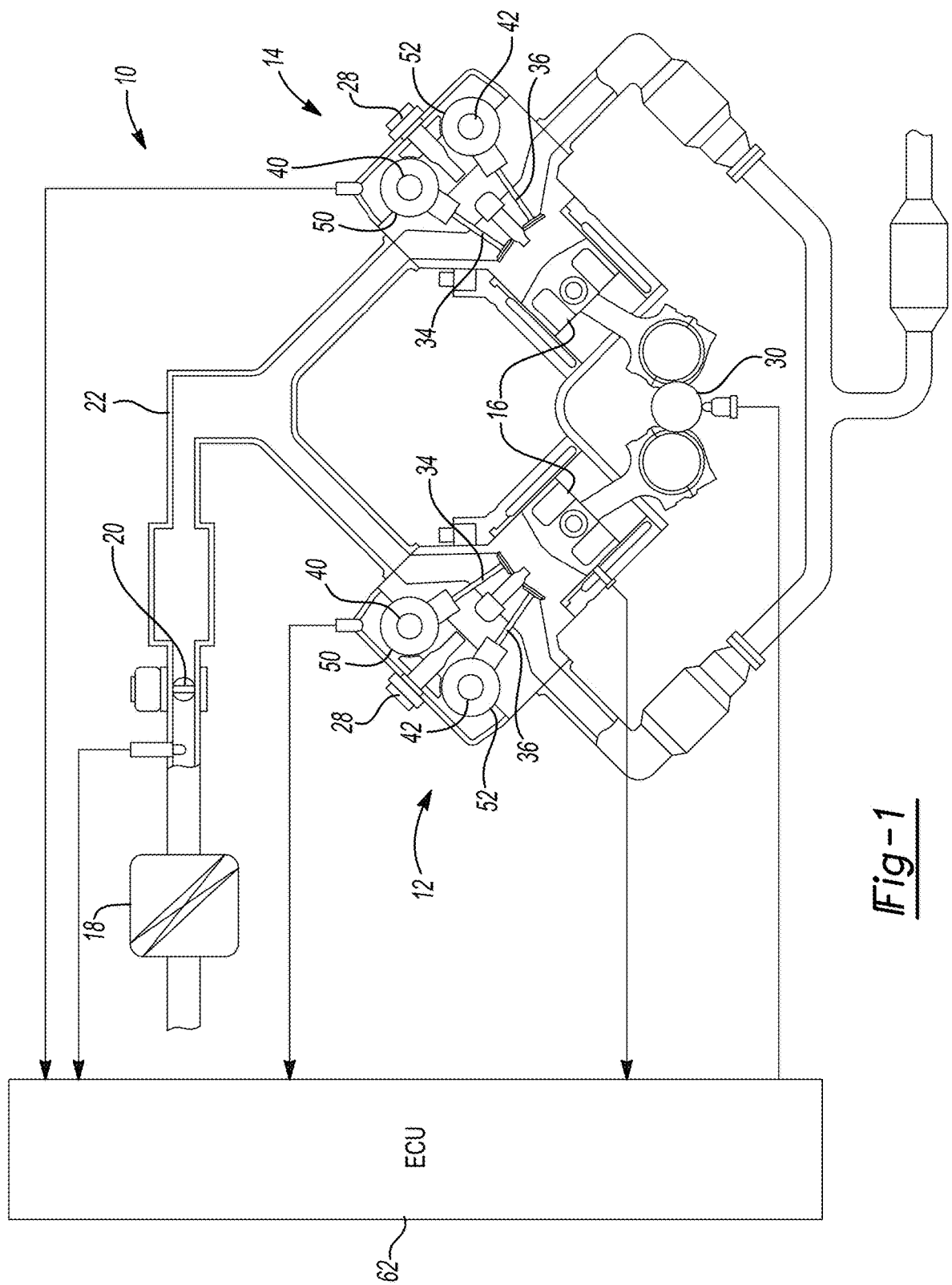
FIG. 1 is a schematic illustration of an exemplary engine having a variable valve timing mechanism that is configured to perform a camshaft pre-positioning function according to the teachings of the present disclosure.

With reference to FIG. 1 of the drawings, an exemplary internal combustion engine 10 is illustrated. The engine 10 is depicted as having a V-configuration with first and second banks 12 and 14, respectively, each of which having one or more cylinders 16. It will be appreciated, however, that the teachings of the present disclosure are applicable to other engine configurations. Intake air passes through an air cleaner 18 and flows to a throttle valve 20 that regulates the flow of fresh air that is used by the engine 10 for combustion. The air that flows past the throttle valve 20 enters an intake passage 22 and is received into a cylinder 16 of the engine 10 during an intake stroke. Fuel may be introduced to the intake air either in the portion of the intake passage 22 proximate the cylinder 16 prior to movement of the air and fuel into the cylinder 16 (i.e., port injection), and/or after the air has been introduced to the cylinder 16 (i.e., direct injection). The mixture of air and fuel in the cylinder is ignited by a spark plug 28 and burns, creating gases that push a piston downward in the cylinder 16 to rotate a crankshaft 30. The gases generated through the burning of the air-fuel mixture in the cylinder 16 are subsequently exhausted from the cylinder 16.

Each cylinder 16 has one or more intake valves 34 and one or more exhaust valve 36 that can be opened to permit air to flow into or out of the cylinder 16. The opening and closing of the intake valve(s) 34 and the exhaust valve(s) 36 is controlled by one or more camshafts. In the example provided, each bank 12, 14 has an intake valve camshaft 40 and an exhaust valve camshaft 42. An endless drive is typically employed to rotationally couple the camshaft(s) 40, 42 to the crankshaft 30. The endless drive typically includes sprockets or toothed pulleys, which are coupled to the camshaft(s) 40, 42 and the crankshaft 30, and a chain or toothed belt that is fitted about the sprockets or toothed pulleys. Depending on the configuration of the engine, the endless drive may be configured to provide a desired speed reduction between the crankshaft 30 and the camshaft(s). In the example provided, the engine 10 is a four-stroke engine and as such, the endless drive is configured so that the intake and exhaust valve camshafts 40 and 42 rotate at one-half the rotational speed of the crankshaft 30.

The engine 10 further includes one or more variable valve timing (VVT) mechanisms that are selectively employed to alter the phasing of a camshaft (i.e., the timing relative to the rotational position of the crankshaft 30 of the opening and closing of an associated set of valves). In the example provided, each bank 12, 14 has an intake VVT mechanism 50 and an exhaust VVT mechanism 52. The intake and exhaust VVT mechanisms 50 and 52 are generally similar and are well known in the art. Accordingly, a discussion of the intake VVT mechanism 50 will suffice.

Figure 2:
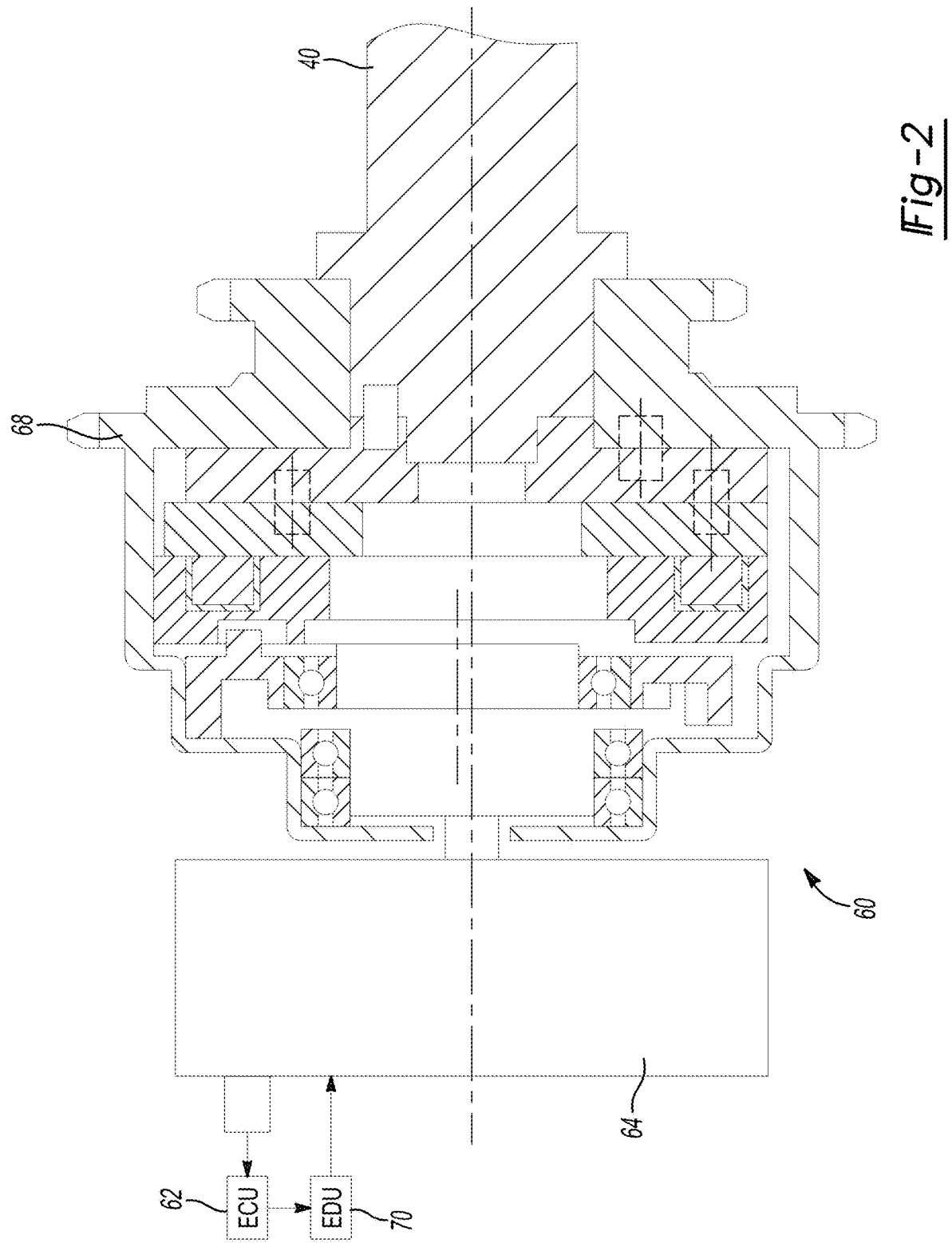
FIG. 2 is a schematic illustration of a part of the engine of FIG. 1, illustrating the variable valve timing mechanism in more detail.

With additional reference to FIG. 2, the intake VVT mechanism 50 is operated by an actuator 60 that is controlled by an engine control module (ECU) 62. In brief, the ECU 62 controls the actuator 60 as needed to advance or retard the timing of the camshaft 40 during the operation of the engine 10 in accordance with a predetermined control methodology, generally for reducing the rate of fuel consumption of the engine 10. The actuator 60 includes an electric motor 64 that can be operated to cause relative rotation between the camshaft 40 and an element of the endless drive that provides rotary power to the camshaft 40 (i.e., the sprocket 68 in the particular example provided).

Figure 3:
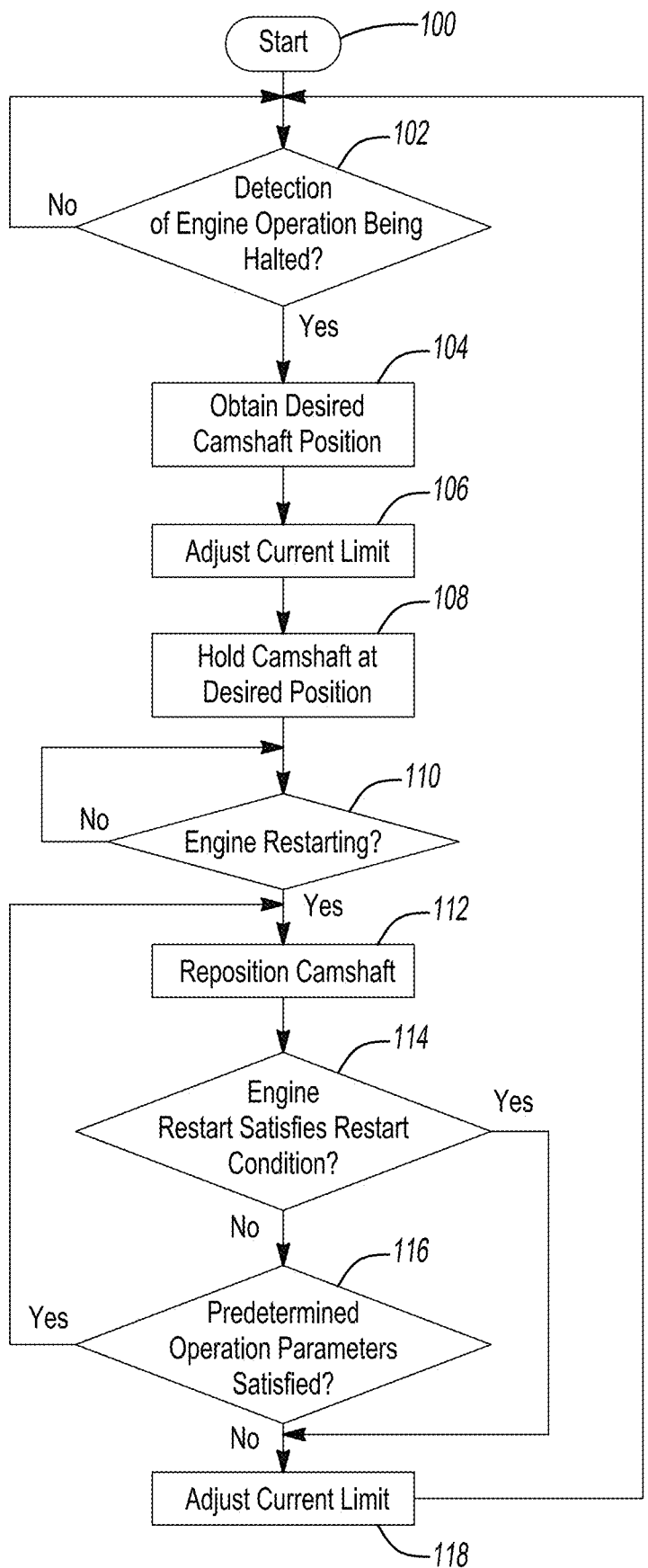
FIG. 3 is a schematic illustration in flowchart form of an exemplary method for performing a camshaft pre-positioning function according to the teachings of the present disclosure.
Figure 4:
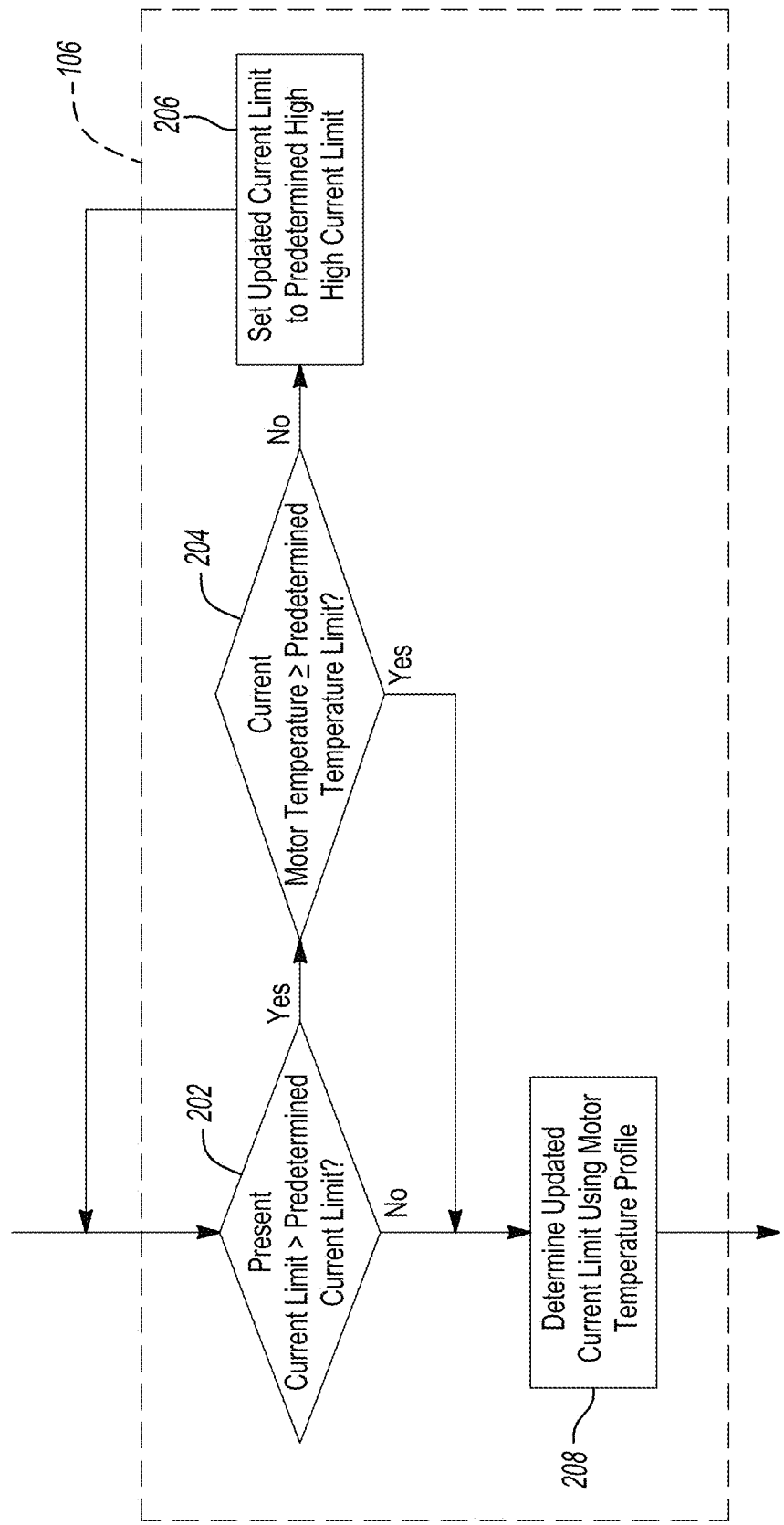
FIG. 4 is a schematic illustration in flowchart form of an exemplary method for adjusting a current limit according to the teachings of the present disclosure.

The engine 10 has start-stop capabilities in which its operation will be halted (by the ECU 62) in a situation where a vehicle (not shown) that is propelled by the engine 10 comes to a stop for a predetermined time interval. The various VVT mechanisms on the engine 10 (i.e., the intake and exhaust VVT mechanisms 50 and 52) can be employed to re-position the intake and exhaust valve camshafts 40 and 42, respectively, so that the engine 10 is in a condition that is thought to be more suited to re-starting at the conclusion of a "start-stop" cycle, for example to have the engine 10 start more quickly and/or with fewer emissions. In the example provided, each of the intake and exhaust VVT mechanisms 50 and 52 includes a mechanism controller 70 that is configured to monitor and operate the actuator 60, but it will be appreciated that some or all of the monitoring and controlling functions performed by the mechanism controller 70 could be performed by the ECU 62. Each mechanism controller 70 is configured to perform the routines that are schematically illustrated in FIGS. 3 and 4. In brief, the mechanism controllers 70 are configured to operate the electric motors 64 of the actuators 60 with an elevated level of current under certain conditions until the engine 10 has been restarted. Configuration in this manner permits the electric motors 64 to be "over-driven" to permit the phasing of the camshaft to be more quickly changed during the restarting of the engine 10 to not only improve start-ability, but to also reduce emissions and improve fuel economy.

In FIG. 3, control begins at bubble 100 and proceeds to decision block 102 where control determines whether the mechanism controller 70 detects whether engine operation is being halted. Various criteria can be employed by the mechanism controller 70 to determine that engine operation is being halted, such as a signal generated by the ECU 62. In the example described herein in further detail, two example criteria are employed by the mechanism controller 70 to identify a situation where engine operation is being halted, although it should be understood that any type of criteria may be utilized to determine whether engine operation is being halted.

A first example criteria that can be employed by the mechanism controller 70 to identify a situation where engine operation is being halted concerns the rotational speed of the engine 10, and more specifically, whether the rotational speed of the engine 10 has dropped below a predetermined speed threshold for a time that exceeds a predetermined time. It should be understood that the rotational speed of other components (e.g., the camshaft 40, the crankshaft 30, the electric motor 64, etc.) may be utilized to determine whether the engine operation is being halted. Because the rotational speed of the electric motor 64 is proportional to the rotational speed of the engine 10, the mechanism controller 70 can employ the rotational speed of the electric motor 64 to make the determination regarding the rotational speed of the engine 10. The electric motor 64 includes a position sensor that senses a rotational position of the rotor of the electric motor 64 and responsively generates a rotor position signal that is transmitted to the mechanism controller 70. The mechanism controller 70 can employ the position sensor to control commutation of the electric motor 64, as well as to determine the rotational speed of the electric motor 64. Alternatively, a rotational speed of the rotor of the electric motor 64 can be determined by the mechanism controller 70 from the magnitude of the back electromagnetic force (emf) that is generated by the electric motor 64. The mechanism controller 70 can start a timer once the mechanism controller 70 determines that a rotational speed of the rotor is below a rotational speed that correlates to the predetermined speed threshold of the engine 10. As such, the first criteria is satisfied at a point in time where the rotational speed of the rotor is maintained at a rotational speed that is below the rotational speed that correlates to the predetermined speed threshold of the engine 10 for a time that equals or exceeds the predetermined time.

A second example criteria that can be employed by the mechanism controller 70 to identify a situation where engine operation is being halted concerns the magnitude of a requested duty cycle that is employed to power the electric motor 64. Absent a need or desire to pre-position a camshaft, the electric motor 64 of the actuator 60 would need no electric power in a situation where the engine 62 has ceased to operate. As such, a requested duty cycle having a magnitude outside of a predetermined duty cycle range or zone is indicative of the halting of the operation of the engine 10. Accordingly, the second criteria is satisfied when the requested duty cycle has a magnitude that is outside the predetermined duty cycle range.

In the example provided, control determines that operation of the engine is being halted when both the first criteria and second criteria are satisfied. It will be appreciated, however, that satisfaction of the first criteria alone, that satisfaction of the second criteria alone, or that satisfaction of either the first criteria or the second criteria could be employed by control to determine that operation of the engine 10 is being halted.

In decision block 102, if control does not determine that operation of the engine 10 is being halted, control loops back to decision block 102. If, however, control determines that operation of the engine 10 is being halted, control proceeds to block 104.

In block 104, control obtains a desired camshaft shut-down position of the camshaft. As discussed above, the desired camshaft shut-down position is a position into which a camshaft is pre-positioned during the "stop" part of a "start-stop" cycle when the engine 10 is not operating so that the engine 10 is in a condition that is thought to be more suited to re-starting at the conclusion of a "start-stop" cycle. As an example, the mechanism controller 70 may obtain the desired camshaft shut-down position from the ECU 62, which may store the desired camshaft shut-down position or dynamically calculate the desired camshaft shut-down position based on, for example, various electrical and mechanical characteristics of the electric motor 64.

In block 106, control adjusts a current limit of the magnitude of the electrical current that is supplied to the electric motor 64 of the actuator 60. The current limit may be adjusted based on at least one of present current limit, a predetermined current limit, a current motor temperature, a predetermined temperature limit, and a motor temperature profile. Example current adjustment controls performed by the mechanism controller 70 are described below in further detail with reference to FIG. 4.

In block 108, control holds the camshaft at the desired camshaft pre-start phasing. As an example, the mechanism controller 70 can provide the electric motor 64 with current having a magnitude that is less than or equal to the current limit determined at block 106 to hold the camshaft at the desired camshaft pre-start phasing.

In decision block 110, control determines if the engine 10 is being restarted. The determination that the engine 10 is being restarted can be responsive to the powering of a starter motor, the use of a flag or other control signal designating that the engine 10 is to be restarted, the occurrence of a situation in which any or all of the criteria used in decision block 110 to determine that engine operation is being halted is/are no longer satisfied. If control does not determine that the engine 10 is being restarted, control loops back to block 110. If control determines that the engine 10 is being restarted, control proceeds to block 112.

In block 112, control repositions the camshaft from its current phasing toward or into a desired camshaft phasing. As an example, control retards a phasing of the camshaft 40, 42 relative to the phasing of the crankshaft 30 before/during an engine restart. As another example, control advances a phasing of the camshaft 40, 42 relative to the phasing of the crankshaft 30 before/during an engine restart. In one form, the mechanism controller 70 can provide the electric motor 64 with current having a magnitude that is less than or equal to the updated current limit.

In decision block 114, control determines whether the engine restart satisfies an engine restart condition. In one example, satisfying the engine restart condition may indicate that the engine 10 has resumed operation and that various engine parameters are satisfied, and not satisfying the engine restart condition may indicate that engine 10 has not resumed operation or that various engine parameters are not satisfied during/upon completion of the engine restart. Determining whether various engine parameters are satisfied may be based on a comparison of the rotational speed of the crankshaft 30 to a threshold value, a comparison of the rotational speed of the engine 10 to a threshold value, whether the magnitude of the duty cycle for powering the electric motor 64 is within the predetermined duty cycle range, among other engine parameters.

If control determines at block 114 that the engine restart does not satisfy the restart condition, control proceeds to block 116, where control determines whether predetermined operation parameters of the engine 10 are satisfied. In one example, satisfying the predetermined operation parameters may indicate that the engine 10 continues to properly function (or function in accordance with a set of predefined criteria) when the engine restart condition is not satisfied, and not satisfying the predetermined operation parameters may indicate that engine 10 is not properly functioning (e.g., the ECU 62 and/or the mechanism controller 70 detects an engine/mechanism fault) when the engine restart condition is not satisfied. Control may determine whether the predetermined operation parameters of the engine 10 are satisfied based on various engine parameters, such as the rotational speed of the crankshaft, the rotational speed of the engine 10, the magnitude of the duty cycle for powering the electric motor 64, the value of the timer, among other engine parameters for determining proper functioning of the engine 10.

Additionally or alternatively, the determination that the predetermined operation parameters are satisfied can be based in whole or in part on a threshold time value and a value of a timer of the mechanism controller 70 that increments proportionally to the elapsing of the occurrence of one or more predetermined events, such as determining that the engine 10 is being restarted or that the rotational speed of the crankshaft 30 exceeds a predetermined threshold.

As an example, the predetermined operation parameters are satisfied when the value of the timer indicates that the engine restart is completed within a predetermined period of time. As another example, the predetermined operation parameters may not be satisfied when the value of the timer indicates that the engine restart is not completed within the predetermined period of time. From the foregoing, it will be appreciated that a determination that the engine 10 has been restarted involves control determining that all necessary conditions or parameters associated with the engine 10 resuming operation, including the lapsing of any timers, have been sufficiently satisfied and does not relate to the ability of the engine 10 to operate in the absence of the supply of rotational input from anything other than combustion within the engine 10.

As another example, control may determine the predetermined operation parameters are satisfied when the magnitude of the duty cycle for powering the electric motor 64 is within a predetermined duty cycle range and the speed of the electric motor 64 is greater than or equal to a minimum predetermined threshold speed (e.g., 0). As yet another example, control may determine the predetermined operation parameters are not satisfied when the magnitude of the duty cycle for powering the electric motor 64 is outside a predetermined duty cycle range and the speed of the electric motor 64 is less than or equal to a minimum predetermined threshold speed (e.g., 0).

If control determines at block 116 that the predetermined operation parameters are satisfied, control proceeds to block 112. If, however, control determines at block 116 that the predetermined operation parameters of the engine 10 are not satisfied, control proceeds to 118.

Returning to block 114, if control determines that the engine restart satisfies the restart condition, control proceeds to block 118, where control adjusts the current limit. In one form, the current limit may be adjusted based on at least one of a predetermined current limit, a current motor temperature, a predetermined temperature limit, a motor temperature profile, and an engine temperature profile. As an example, control may reset the current limit used to power the electric motors 64 to a lower level that is associated with the normal operation of the engine 10.

In FIG. 4, a current adjustment control performed by the mechanism controller 70 at block 106 of FIG. 3 is shown. The current adjustment control begins at decision block 202, where current adjustment control determines whether a present current limit is greater than a predetermined current limit. The present current limit is employed by the mechanism controller 70 to limit the magnitude of the electrical current that is supplied to the electric motor 64 of the actuator 60. If current adjustment control determines that the present current limit is not greater than the predetermined current limit in decision block 202, control proceeds to block 208, where current adjustment control employs a temperature of the electric motor 64 and a motor temperature profile to determine an updated current limit (e.g., a new value of the present current limit). The motor temperature profile could comprise an algorithm, look-up table or mapping of various parameters, including the temperature of the electric motor 64, that correlate the various parameters to a current limit for the electric motor 64.

If the current adjustment control determines that the present current limit is greater than the predetermined current limit, current adjustment control proceeds to decision block 204. In decision block 204, current adjustment control determines whether the temperature of the electric motor 64 of the actuator 60 is greater than or equal to a predetermined motor temperature limit. If the temperature of the electric motor 64 is greater than or equal to the predetermined motor temperature limit in decision block 204, current adjustment control proceeds to block 208, where the updated current limit is determined in the manner described above.

Returning to decision block 204, if control determines that the temperature of the electric motor is not greater than or equal to the predetermined motor temperature limit, current adjustment control proceeds to block 206, where current adjustment control sets the updated current limit to a predetermined high current limit. The predetermined high current limit may be equal to or different from the predetermined current limit in decision block 202. Control then proceeds to decision block 202.

It will be appreciated that the set of predetermined conditions that are employed to determine whether the predetermined high current limit will be used could include other conditions, such as a parameter that is related to the amount that the electric motor 64 has been used. For example, if the electric motor 64 has been used to a point where a predetermined percentage, such as 80 percent, of its useful life has been consumed or used, then current adjustment control can be configured to inhibit use of the predetermined high current limit. Additionally or alternatively, the predetermined high current limit can be varied over the useful life of the electric motor 64.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method for operating a variable valve timing mechanism that controls a phase angle of a camshaft in an engine, the variable valve timing mechanism having an electric motor, the method comprising:
    applying electric power with a current of a first magnitude to the electric motor to operate the electric motor in an engine operating mode that controls the phase angle of the camshaft;
    determining that operation of the engine has been interrupted;
    applying electric power with a current of a second magnitude to the electric motor to operate the electric motor in a re-start mode to control the phase angle of the camshaft after determining that operation of the engine has been interrupted, the second magnitude being greater than the first magnitude and greater than an operational motor current limit to over-drive the electric motor;
    determining that operation of the engine has resumed; and
    applying electric power with the current of the first magnitude to the electric motor to operate the electric motor in the engine operating mode to control the phase angle of the camshaft in response to determining that operation of the engine has resumed.

2. The method of claim 1, wherein determining that operation of the engine has been interrupted includes determining that a rotational speed of the electric motor is less than or equal to a predetermined motor speed threshold.

3. The method of claim 2, wherein determining that operation of the engine has been interrupted includes determining that the rotational speed of the electric motor has been less than or equal to the predetermined motor speed threshold for a length of time that is greater than or equal to a predetermined time threshold.

4. The method of claim 1, wherein determining that operation of the engine has been interrupted includes determining that a magnitude of a duty cycle with which electrical power is supplied to the electric motor is within a predetermined range of magnitudes.

5. The method of claim 1, wherein determining that operation of the engine has been interrupted includes determining that a magnitude of a duty cycle with which electrical power is supplied to the electric motor is less than a predetermined duty cycle threshold.

6. The method of claim 1, wherein determining that operation of the engine has resumed includes determining that a rotational speed of the electric motor is greater than a predetermined motor speed threshold.

7. The method of claim 6, wherein determining that operation of the engine has resumed includes determining that the rotational speed of the electric motor has been greater than or equal to the predetermined motor speed threshold for a length of time that is greater than or equal to a predetermined time threshold.

8. The method of claim 6, wherein determining that operation of the engine has resumed includes determining that a magnitude of a duty cycle with which electrical power is supplied to the electric motor is greater than or equal to a predetermined duty cycle threshold.

9. The method of claim 1, wherein determining that operation of the engine has resumed includes determining that a magnitude of a duty cycle with which electrical power is supplied to the electric motor is greater than or equal to a predetermined duty cycle threshold.

* * * * *